United States Patent
Hinton et al.

(10) Patent No.: US 8,341,694 B2
(45) Date of Patent: *Dec. 25, 2012

(54) METHOD AND SYSTEM FOR SYNCHRONIZED ACCESS CONTROL IN A WEB SERVICES ENVIRONMENT

(75) Inventors: Heather M. Hinton, Austin, TX (US); Ivan M. Milman, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1115 days.

This patent is subject to a terminal disclaimer.

(21) Appl. No.: 11/456,190

(22) Filed: Jul. 8, 2006

(65) Prior Publication Data

US 2008/0022362 A1 Jan. 24, 2008

(51) Int. Cl.
*G06F 7/04* (2006.01)
(52) U.S. Cl. ......... 726/2; 726/1; 707/1; 707/6; 707/200; 707/E17.112
(58) Field of Classification Search .......... 726/2; 707/1, 707/E17.112

See application file for complete search history.

(56) References Cited

U.S. PATENT DOCUMENTS

| | | | |
|---|---|---|---|
| 5,832,211 A | 11/1998 | Blakley, III et al. | |
| 5,838,903 A | 11/1998 | Blakely, III et al. | |
| 5,862,323 A | 1/1999 | Blakley, III et al. | |
| 6,094,721 A | 7/2000 | Eldridge et al. | |
| 6,519,647 B1 | 2/2003 | Howard et al. | |
| 6,986,038 B1 | 1/2006 | Leah et al. | |
| 6,986,039 B1 | 1/2006 | Leah et al. | |

(Continued)

OTHER PUBLICATIONS

"Methods of Organizational Information Security"; Martins et al, Academia Militar—Cinamil, Lisboa, Portugal, University of Minho—Department of Information Systems, Guimarães, Portugal. Global Security, Safety, and Sustainability Communications in Computer and Information Science, 2010, vol. 92, 120-130, Publisher: Springerlink.*

(Continued)

*Primary Examiner* — Taghi Arani
*Assistant Examiner* — Jason Lee
(74) *Attorney, Agent, or Firm* — Jeffrey S. LaBaw; David H. Judson

(57) ABSTRACT

Access controls for a Web service (which controls are based on abstract WSDL definitions) are defined for a WSDL defined protected object space and, as such, are loosely coupled with the concrete WSDL binding derived from those definitions, preferably on a per binding level. This WSDL-defined POS is in turn loosely bound to a resource-specific protected object space definition. This loose coupling is leveraged to allow changes (e.g., updates) to the abstract WSDL binding's protected object space to be transitively applied to the application-specific protected object space. If appropriate, changes to the resource-specific protected object space may be applied to the WSDL's protected object space. Thus, according to the invention, the coupling may be one-way (typically, from the WSDL POS to the resource level POS) or two-way (from the WSDL POS to the resource level POS and vice versa). This technique ensures that different security policies are not applied unintentionally to the same resource (for example, one at the Web services entry level, and the other at the resource level). By synchronizing the protected object spaces in the manner described, neither the entity that deploys the application nor the security administrator need to be aware of the differences between the Web service request and the resource request.

23 Claims, 10 Drawing Sheets

U.S. PATENT DOCUMENTS

| | | |
|---|---|---|
| 7,236,973 B2 * | 6/2007 | Kalthoff et al. ............... 707/650 |
| 2005/0192925 A1 | 9/2005 | Nichols |
| 2006/0010483 A1 | 1/2006 | Buehler et al. |
| 2006/0031441 A1 | 2/2006 | Davis et al. |
| 2006/0080352 A1 * | 4/2006 | Boubez et al. ................ 707/102 |
| 2007/0050336 A1 * | 3/2007 | Bugir et al. ........................ 707/3 |
| 2007/0067421 A1 * | 3/2007 | Angelov ....................... 709/220 |
| 2008/0098453 A1 * | 4/2008 | Hinton et al. ..................... 726/1 |

OTHER PUBLICATIONS

Coetzee et al., "An Access Control Framework for Web Services," Information Management & Computer Security, vol. 13, No. 1, pp. 29-38, 2005.

Migliardi et al., "Standards Based Heterogenous Metacomputing: The Design of Harness II," 2002, at http://www.mathcs.emory.edu/harness/pub/general/hcw02.pdf.

* cited by examiner

```
<wsdl:portType name="WeatherForecast">
    <wsdl:operatiion name="getTodayForecast"
parameterOrder="startDate">
        <wsdl:input message="intf:getTodayForecastRequest"
name="getTodayForecastRequest"/>
        <wsdl:output message="intf:getTodayForcastResponse"
name="getTodayForecastResponse"/>
    <wsdl:operation>
...
    <wsdl:operation name="subscribeToForecast" parameterOrder="theDate">
        <wsdl:input message="intf:subscribeToForecastRequest"
name="subscribeToForecastRequest"/>
        <wsdl:output message="intf:subscribeToForecastResponse"
name="subscribeToForecastResponse"/>
    </wsdl:operation>
<wsdl:portType>
<wsdl:binding name="WeatherForecastSMTPBinding" type="intf:WeatherForecast">
    <soap:binding style="document" transport="http://example.com/smtp"/>
    <wsdl:operation name="SubscribeToForecast">
      <wsdl:input message="SubscribeToForecast">
        <soap:body parts="body" use="literal"/>
        <soap:header message="SubscribeToForecast" .../>

</wsdl:input>
    </wsdl:operation>
  </soap:binding>
<wsdl:binding name="WeatherForecastSOAPBinding" type="intf:WeatherForecast">
    <soap:binding style="document"transport="http://schemas.xmlsoap.org/soap/http"/>
        <wsdl: operation name="getTodayForecast">
            <wsdl:input name="getTodayForecastRequest">
                <wsdlsoap:body use="literal"/>
            </wsdl:input>
            <wsdl:output name="getTodayForecastResponse">
                <wsdlsoap:body use"literal"/>
            </wsdl:output>
    </wsdl:operation>
</wsdl:binding>
```

FROM FIG. 2A

```
<wsdl:binding name="WeatherForecastJMSBinding"type="intf:WeatherForecast">
    <soap:binding style="rpc" transport="http://schemas.xmlsoap.org/soap/jms"/>
    <wsdl:operation name="getTodayForecast">
        <soap:operation soapAction=""/>
        <wsdl: input name=getTodayForecastRequest">
            <wsdlsoap:body use="literal"/>
        </wsdl:input>
        <wsdl:output name="getTodayForecastResponse">
            <wsdlsoap:body use="literal"/>
        </wsdl:output>
    </wsdl:operation>
</wsdl:binding>

<wsdl:service name="ForecastSubscriptionService">
    <wsdl:port name="ForecastSubscriptionSMTP"
        binding="intf:WeatherForecastSMTPBinding">
        <wsdlsoap:address location="mailto:subscribe@weatherservice.com"/>
    </wsdl:port>
<wsdl:service>

<wsdl:service name="WeatherForecastService">
    <wsdl:port name="WeatherForecastHTTP"
        binding="intf:WeatherForecastHTTPBinding">
        <wsdlsoap:address location=http:///www.weatherservice.com/WeatherService/WeatherForecast/>
    </wsdl:port>
```

*FIG. 2B*

METHOD AND SYSTEM FOR SYNCHRONIZED ACCESS CONTROL IN A WEB SERVICES ENVIRONMENT

COPYRIGHT STATEMENT

A portion of the disclosure of this patent document contains material that is subject to copyright protection. The copyright owner has no objection to the facsimile reproduction of the patent document as it appears in the Patent & Trademark Office file or records, but it otherwise reserves all copyright rights.

BACKGROUND OF THE INVENTION

1. Technical Field

The present invention relates generally to Web service-based access control.

2. Background of the Related Art

A Web service is a software system identified by a URI, whose public interface and bindings are defined and described using XML. Its definition can be discovered by other software systems. These systems may then interact with the Web service in a manner prescribed by the Web service definition, using XML-based messages conveyed by Internet protocols.

Typically, a Web service is described using a standard, formal XML notion, called its service description. A service description typically conforms to a machine process-able format such as the Web Services Description Language (or WSDL). WSDL describes the public interface necessary to interact with the service, including message formats that detail the operations, transport protocols and location. The supported operations and messages are described abstractly and then bound to a concrete network protocol and message format. A client program connecting to a Web service reads the WSDL to determine what functions are available on the server. Computing entities running the Web service communicate with one another using XML-based messaging over a given transport protocol. Messages typically conform to the Simple Object Access Protocol (SOAP) and travel over HTTP (over the public Internet) or other reliable transport mechanisms (such as IBM® MQSeries® technologies and CORBA, for transport over an enterprise intranet). The Web service hides the implementation details of the service, allowing it to be used independently of the hardware or software platform on which it is implemented and also independently of the programming language in which it is written. This allows and encourages Web services-based application to be loosely-coupled, component-oriented, cross-technology implementations. Web services typically fulfill a specific task or a set of tasks. They can be used alone or with other Web services to carry out a complex aggregation or a business transaction. A client program connecting to a Web service reads the WSDL to determine what functions are available on the server.

With the advent of Web services, computing resources are exposed in an implementation neutral manner. Thus, for example, consider a reusable code component such as an enterprise Java bean or "EJB." Typically, an EJB is protected with access control decisions on a method call. When exposed as a Web service, however, the EJB is defined by the Web service name, port and operation, where the operation typically represents a method. Because of the way in which a Web service is described (namely, through the WSDL), this "operation" may also correspond to the same functionality provided by a C-based resource, a CICS-based resource, or the like. This is another way of saying that a given functionality (whether implemented by an EJB, a C-based resource, a CICS-based resource, or the like) can be described with a single WSDL. The overall resource is described by the abstract WSDL, and then each particular implementation is described by a concrete binding of that WSDL.

It is known to allow for the application of access control policies (such as access control lists, or ACLs) to a given resource at the level of a WSDL, meaning that the same access control policies are applied to the resource, regardless of its back end implementation. Such policies are typically applied to the resource in the context of a virtual representation called a protected object space. A protected object space is a logical and hierarchical portrayal of resources belonging to a domain. The application of security policy at the level of a WSDL is consistent with a "best practice" approach to access control, where an access control decision preferably is made as close to the "edge" as possible. This technique, however, does introduce the potential that an entity offering the Web service has the same authorization decision implemented in two places, namely, an operation level decision at the Web service entry, and a method level decision at an application level. This in turn introduces the possibility for two different policies applied to the same resource, with one policy applied at the Web services/operation level, and another policy applied at the application/EJB level. As a consequence, and to avoid potential conflicts, access control policies currently must be manually tracked and managed by a security administrator.

BRIEF SUMMARY OF THE INVENTION

According to the invention, a Web service-based access control (that is based on a WSDL definition) is loosely coupled with a concrete WSDL binding, preferably on a per-binding level. The concrete WSDL binding in turn is loosely bound to a resource-specific protected object space definition. The present invention leverages this loose coupling to allow changes to the abstract WSDL binding's protected object space to be transitively applied to the resource-specific protected object space, as well as changes to the resource-specific protected object space to be optionally applied to the WSDL derived protected object space. This approach allows for a consistent approach to the management of protected object spaces across platforms.

In an illustrative embodiment, a method of synchronized access control in a Web services environment includes the steps of generating a Web service protected object space from a WSDL, and generating an application-specific protected object space from an application code base (such as an enterprise archive file (EAR), or the like). A set of one or more loose couplings are then defined (e.g., using a visual mapping tool) between corresponding elements in the protected object spaces. A set of mapping rules are defined by these couplings. The mapping rules define whether and how changes to the elements in one protected object space affect elements in the other protected object space. At runtime, a policy management tool is monitored. If a policy change (e.g., an update) occurs to an element in one of the protected object spaces, this change is parsed against the mapping rules. If, as a result of the parsing a given mapping rule is implicated, the change is applied to a corresponding element in the other protected object space. The changes may be one-way (e.g., changes to the concrete WSDL protected object space are propagated to the resource-specific protected object space, but not vice-versa), or two-way (meaning that access control changes are propagated in both directions).

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 2 is a representative access manager for a Web service;

DETAILED DESCRIPTION OF AN ILLUSTRATIVE EMBODIMENT

Figure 1:
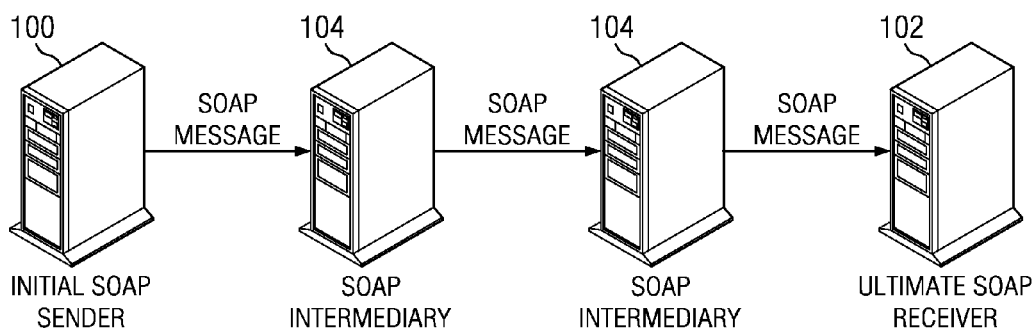
FIG. 1 depicts a Web services environment in which the present invention may be implemented.

As is well known, enterprises are adopting Web Services to ease application integration across heterogeneous environments within and across security domain boundaries. The Organization for the Advancement of Structured Information Standards (OASIS) has recently ratified various Web Services Security (WSS) standards to provide an extensible framework for providing message integrity, confidentiality, identity propagation, and authentication. In a typical scenario, illustrated in FIG. 1, SOAP messages are sent from an initial SOAP sender 100 to an ultimate SOAP receiver 102 along a SOAP message path comprising zero or more SOAP intermediaries 104 that process and potentially transform the SOAP message. The use of SOAP here is merely illustrative, and it should not be taken to limit the scope of the present invention, which does not depend on the particular transport mechanism used to transfer a protected message. The devices 100, 102 and 104 are computing entities, such as data processing systems each comprising hardware and software, which entities communicate with one another over a network, such as the publicly-routed Internet, an intranet, an extranet, a private network, or any other communications medium or link. As described below, a data processing system typically comprises one or more processors, an operating system, an application server, one or more applications and one or more utilities. A given data processing system may be a sender or sending entity, in which case the system is deemed to be on a "sender side" of the transmission, or a receiver or receiving entity, in which case the system is deemed to be on a "receiver side." The applications on the data processing system provide native support for Web services including, without limitation, support for HTTP, SOAP, XML, WSDL, UDDI, and WSFL, among others. Familiarity with these technologies and standards is presumed. Further information regarding SOAP, WSDL, UDDI and WSFL is available from the World Wide Web Consortium (W3C), which is responsible for developing and maintaining these standards; further information regarding HTTP and XML is available from Internet Engineering Task Force (IETF).

A WSDL is an XML document comprising a set of definitions, a definitions element at the root, and a set of additional definitions inside the root. Services are defined using a set of elements, which include: types, which provide data type definitions used to describe the messages exchanged, messages, which represent an abstract definition of the data being transmitted; portType, which is a set of abstract operations; binding, which specifies concrete protocol and data format specifications for the operations and messages defined by a particular portType; and service, which is used to aggregate a set of related ports. A WSDL thus describes a set of one or more endpoints operating on messages. Operations and messages are described abstractly and then bound to a concrete network protocol and format to create an endpoint. Thus, an abstract portion of the WSDL represents a service interface and typically comprises the elements: types, message, and portType; a concrete portion of the WSDL represents a service implementation of the service interface and typically includes the service and binding elements. Thus, the binding element typically is where the notion of "concrete-ness" is introduced. In particular, typically this is where a SOAP binding and a transport method are defined as illustrated in the example of FIG. 2, which is a portion of a representative WSDL showing several of these elements for a Weather Forecast Web service. This WSDL includes a number of different bindings, as well as a URL-defined HTTP accessible resource at which the Web service is obtained. The information in the service element may be used to build a protected object space (POS) for a WSDL, as will be described below, e.g., by hanging the POS for the WSDL (or WSDL binding) under a specific service name/address.

Figure 3:
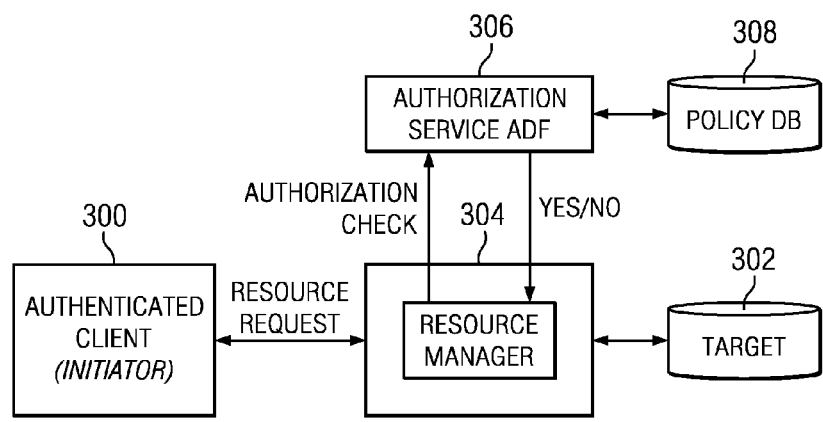
FIG. 3 is a representative portion of a WSDL document.

The present invention preferably is implemented in a system that includes an access manager, which is a component that prevents unauthorized use of resources, including the prevention of use of a given resource in an unauthorized manner. A representative access manager is the Tivoli® Access Manager product, which is available commercially from IBM, and is represented in FIG. 3. Of course, the identification of this commercial product is not meant to be taken to limit the present invention. More broadly, any system, device, program or process that provides a policy/access/service decision may be used for this purpose. Preferably, the access manager provides access control capabilities that conform to The Open Group's authorization (azn) API standard. This technical standard defines a generic application programming interface for access control in systems whose access control facilities conform to the architectural framework described in International Standard ISO 10181-3. The framework defines four roles for components participating in an access request: (1) an initiator 300 that submits an access request (where a request specifies an operation to be performed); (2) a target 302 such as an information resource or a system resource; (3) an access control enforcement function (AEF) 304; and (4) an access control decision function (ADF) 306. As illustrated, an AEF submits decision requests to an ADF. A decision request asks whether a particular access request should be granted or denied. ADFs decide whether access requests should be granted or denied based on a security policy, such as a policy stored in database 308. Components 304, 306 and 308 comprise the access manager. Security policy typically is defined using a combination of access control lists (ACLs), protected object policies (POPs), authorization rules, and extended attributes. An access control list specifies the predefined actions that a set of users and groups can perform on an object. For example, a specific set of groups or users can be granted read access to the object. A protected object policy specifies access conditions associated with an object that affects all users and groups. For example, a time-of-day restriction can be placed on the object that excludes all users and groups from accessing the object during the specified time. An authorization rule specifies a complex condition that is evaluated to determine whether access will be permitted. The data used to make this decision can be based on the context of the request, the current environment, or other external factors. For example, a request to modify an object more than five times in an 8-hour period could be denied. A security policy is implemented by strategically applying ACLs, POPs, and authorization rules to those resources requiring protection. An extended attribute is an additional value placed on an object, ACL or POP that can be read and interpreted by third party applications (such as an external authorization service). The access manager authorization service makes decisions to permit or deny access to resources based on the credentials of the user making the request and the specific permissions and conditions set in the ACLs, POPs, authorization rules and extended attributes.

The goal of a security policy is to adequately protect business assets and resources with a minimal amount of administrative effort. First, an administrator defines what resources should be protected. These resources may be any type of data object, such as files, directories, network servers, messages, databases, queues, or Web resources. Then, the administrator decides what users and groups of users should have access to these protected resources. Alternatively, the administrator may decide what user "roles" should have access to these protected resources (e.g., where a given identified user may have a role of "bank teller"). The administrator also decides what type of access should be permitted to these resources. Finally, the administrator applies the proper security policy on these resources to ensure that only the right users can access them. Access to objects within a domain is controlled by applying a security policy to objects in a protected object space.

As is also known in the art, an access manager (such as illustrated in FIG. 3) represents resources within a domain using a virtual representation referred to as a protected object space (or POS). A protected object space is a logical and hierarchical portrayal of resources belonging to a domain. Typically, the structure of a protected object space comprises two types of objects: resource objects, and container objects. Resource objects are the logical representation of actual physical resources, such as files, services, web pages, message queues, and so on, in a domain. Container objects are structural components that allow resource objects to be grouped hierarchically into distinct functional regions. Security policy can be applied to both types of objects. A protected object space has a root container object. Below the root container object are one or more container objects. Each container object represents an object space that consists of a related set of resources. These resources can be resource objects or container objects. The successful implementation of a security policy requires that the different content types are logically organized (and that the appropriate ACL, POP, and authorization rules are applied). Prior implementations of this type of hierarchical protected object space have relied on these individual container objects being distinct and, in effect, mutually exclusive, e.g., a resource that is managed under a message queue container cannot also be accessed under a web application container).

Figure 4:
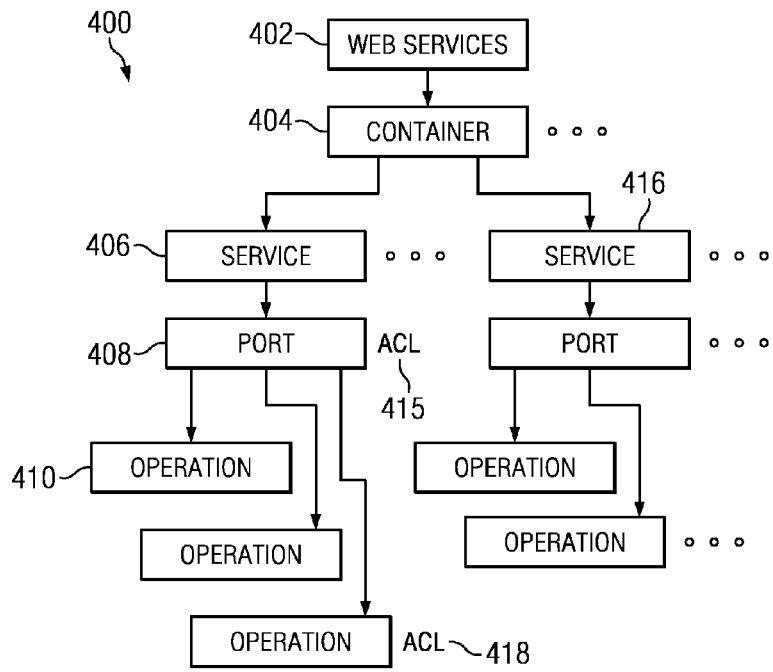
FIG. 4 is a representative Web service protected object space.

FIG. 4 illustrates a sample abstract Web service protected object space 400 comprising a set of hierarchical objects, namely, a root object 402, a container object 404 used as a convenience for maintaining a single path to one or more related Web services, one or more service name objects 406 and 416 identifying the WSDL service (s), one or more port type objects 408 identifying WSDL port type(s), and one or more operation objects 410 identifying WSDL-specified operations. For illustrative purposes only, a port object 408 has an associated ACL 415, as does one of the operation objects 410, namely ACL 418. The two services 406 and 416 may be similar instantiations of the same overall type of service (e.g., a stock quote service) or they may be completely orthogonal services that happen to have the same overall policy applied to them, where this policy is defined, for example, by ACL 412.

Figure 5:
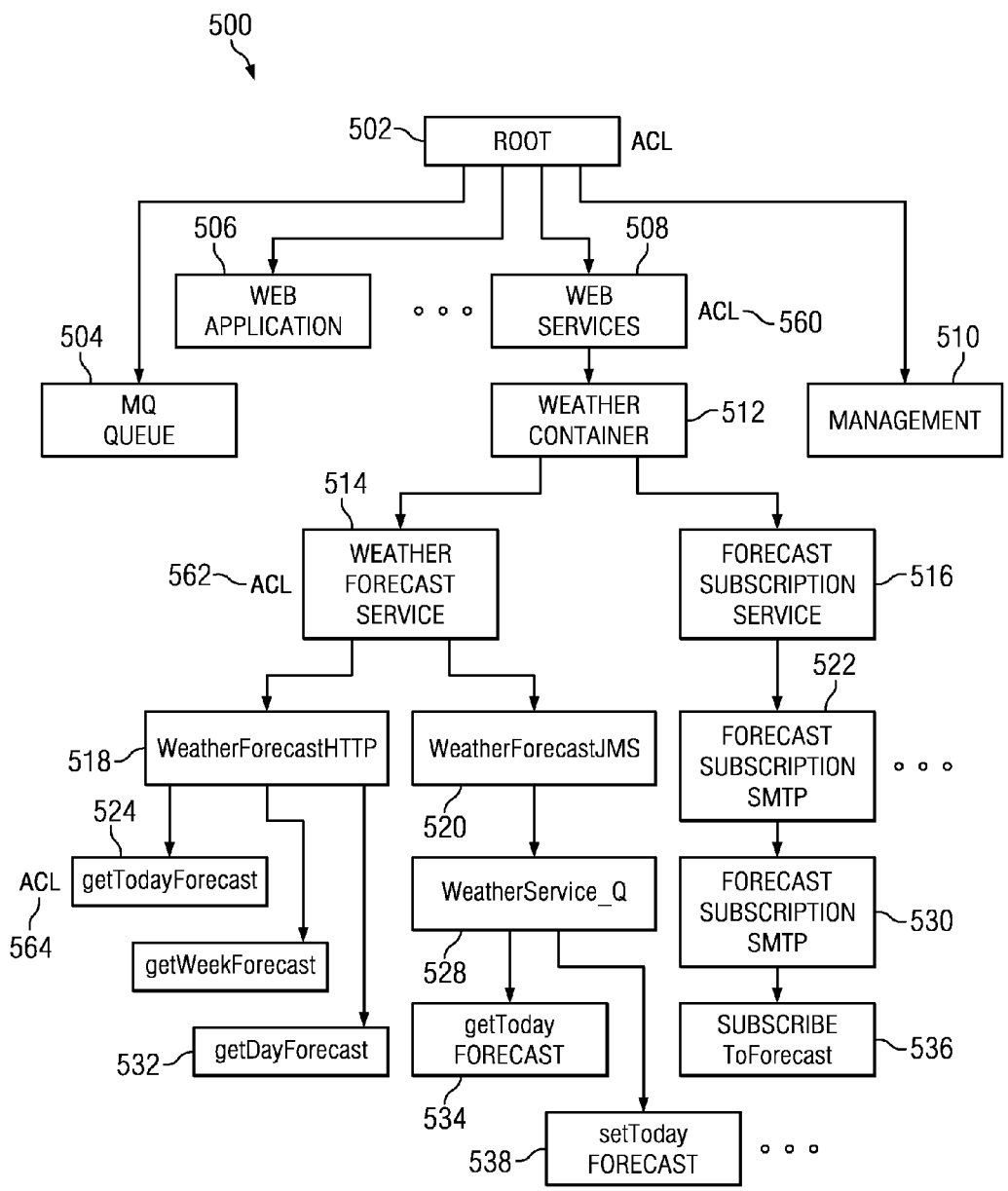
FIG. 5 is a representative WSDL binding.

FIG. 5 illustrates a protected object space tree 500 for a WSDL representation of a resource (a portion of which is shown in FIG. 2), where the implementation of the resource (e.g., EJB versus MQ queue) is unknown. The overall protected object space is anchored by root 502, where root 502 has a number of children, including protected object space 504 for an MQ Queue, a protected object space 506 for a Web application, a Web services container 508, and a Management container 510. Underneath Web services container 508 is a Weather container 512 defined for "weather service" related services. This container is shown with a pair of WSDL defined service 514 and 516, representing (in this example) a Weather Forecast service and a Forecast Subscription service. Subtrees underlying containers 514 and 516 illustrate two different services that are represented by a single Web service container 512. Containers 518 and 520 underlie the Weather Forecast service container 514 and represent two different bindings (HTTP versus JMS) of the Web service defined set of resources. Container 522 illustrates an SMTP binding for the Forecast Subscription service 516. The WeatherForecastHTTP container 518 has several operation containers, including getTodayForecast container 524, getWeekForecast container 526, and getDayForecast container 532. The WeatherForecastJMS container 520 has a WeatherService_Q queue container 528, which itself has a getTodayForecast container 534 and a setTodayForecast container 538. Containers 524 and 534 possibly are the same resource. The container 522 has a Forecast Subscription container 530, which itself has a child container 536 for the SubscribeToForecast operation. Many of the containers have associated ACLs, such as 560, 562 and 564. The access control ACL 560 that is applied to the entire Web services branch of the protected object space tree is "inherited" by all of the children of Web services branch 508. Note, however, that the Web services Weather Forecast Service container 514 has its own ACL 562, meaning that it does not inherit the ACL assigned to the Web services branch of the protected object space. Likewise, the operation "getTodayForecast" 524 has its own ACL 564, meaning that it does not inherit the ACL 562 assigned to the Weather Forecast Service subtree of the protected object space. Thus, this representation of a WSDL defined Web service follows state-of-the-art functionality for the representation and management of ACLs in a protected object space hierarchy. Note that the protected object space is defined so that coarse-grained policies are applied at the service interface level and finer-grained policies are applied at the service implementation level.

Figure 6:
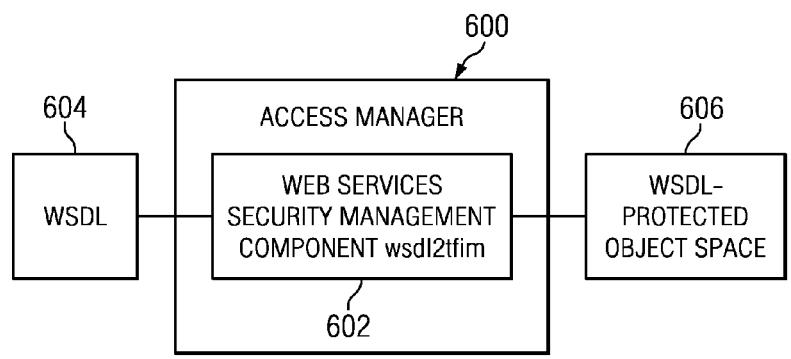
FIG. 6 illustrates how the access manager generates the WSDL protected object space (POS) from a WSDL.

As illustrated in FIG. 6, the concrete WSDL-based protected object space is generated as well as managed by the access manager. In particular, access manager 600 has an associated Web services security management component 602 that provides Web services specific access control enforcement functionality in response to access manager's access control decision functionality. In particular, Web services security management component 602 takes a WSDL description of a resource (or set of resources) and parses the entire WSDL description, including both the concrete (service implementation) and abstract (service interface) descriptions. In the Tivoli® Federated Identity Manager, a "wsd12tfim" command performs this object space creation in an automated manner, although the creation of the protected object space from the WSDL can be performed in any convenient manner.

Figure 7:
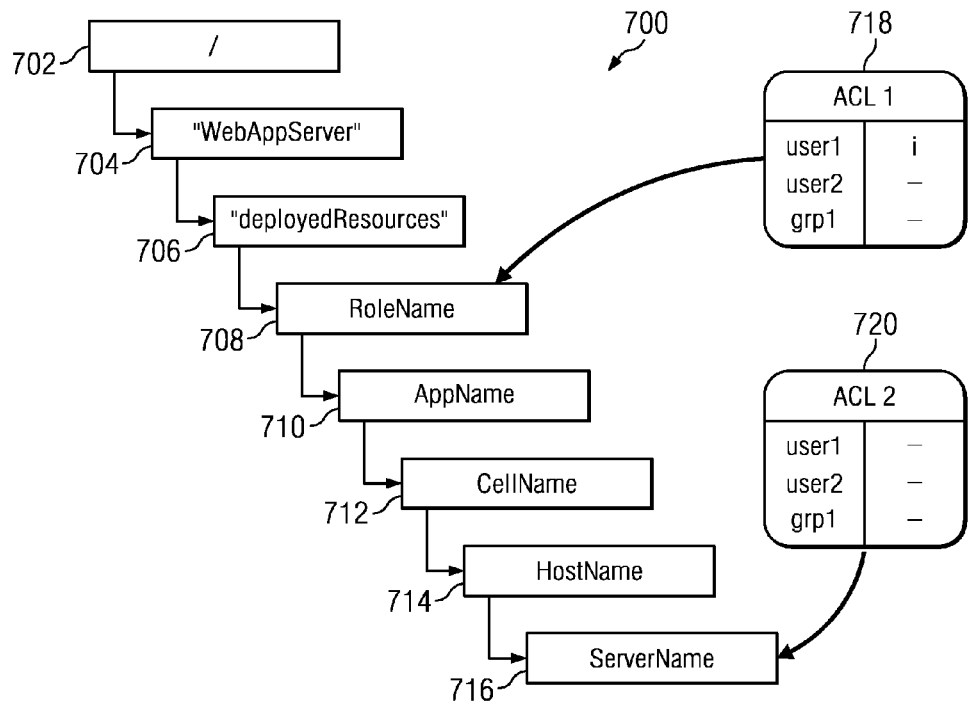
FIG. 7 is a representative resource level protected object space format.

Typically, a Web service uses one or more back-end applications that perform the required service functionality. An application level resource typically also has an associated protected object space. FIG. 7 illustrates a sample application server level protected object space 700 for a set of back-end resources. For illustrative purposes only, the protected object space 700 shown in FIG. 7 represents a sample protected object space for an IBM® WebSphere® application server, but of course clearly this tree-structure POS representation can be applied to other application serving environments. The protected object space 700 contains a root object 702 (used to anchor the POS), a Web application server container 704, a deployed resources object 706, a role name object 708, an application name object 710, a cell name object 712, a hostname object 714, and a server name object 716. For illustrative purposes only, the role name object 708 is shown as having an associated ACL 718, as does the server name object, which has associated ACL 720. This protected object space reflects the deployment options for WebSphere application server-based resources, where multiple roles may be defined with a single ACL (e.g., 718), where this ACL may be overridden in some cases for a given server's hosting of a resource (as shown with ACL 720 for example).

Figure 8:
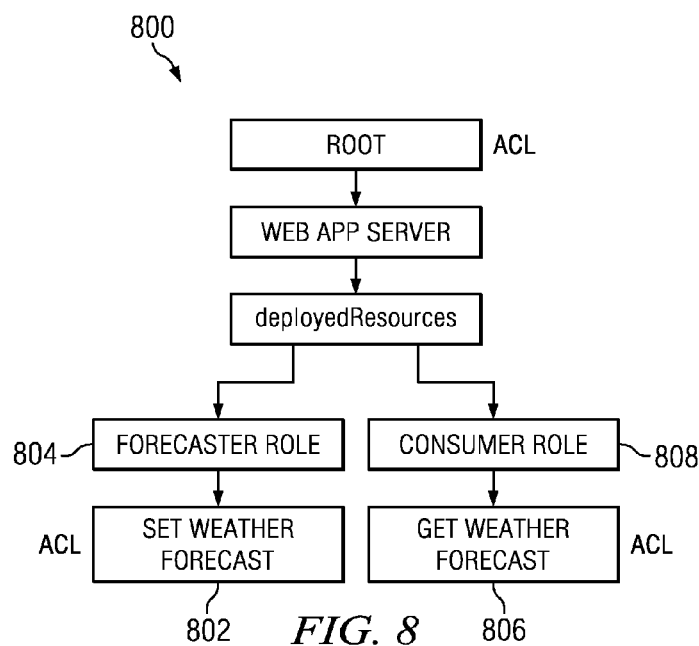
FIG. 8 is a representative resource level protected object space associated with the WSDL binding shown in FIG. 5.

FIG. 8 illustrates an instantiation of the sample application level POS; in this example, which is merely representative, protected object space 800 is associated with a back-end application server in which the weather forecast generation function is managed (e.g., by an EJB). In this example POS, the weather forecast application 802/806 can be accessed (subject to policy compliance) by an entity in the role of a forecaster 804 or a consumer 808. In particular, a person or entity in the Forecaster Role sets the Weather Forecast via application 802, whereas a person or entity in the Consumer Role gets the Weather Forecast via application 806.

Figure 9:
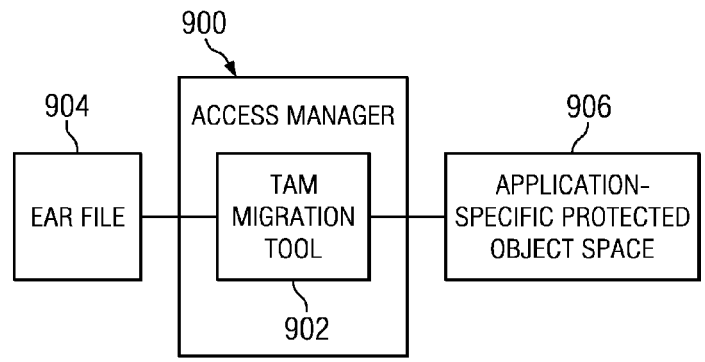
FIG. 9 illustrates how the access manager generates the resource specific protected object space from application server back-end code, such as an EAR.

As illustrated in FIG. 9, the application specific POS is generated by the access manager. In particular, access manager 900 has an associated migration tool 902 that generates the application specific POS 906 from an EAR file 904 input to the tool. In the Tivoli® Access Manager, a "migrateEAR4" command performs this object space creation in an automated manner, although the creation of the protected object space from the EAR (or other back-end code component) can be performed in any convenient manner. Tivoli® Access Manager for Business Integration has a similar tool that performs this object space creation in an automated manner for an MQSeries® environment. A protected object space, such as shown in FIG. 7, results from operation of the migration tool 902.

According to the present invention, access controls for a Web service (which controls are based on abstract WSDL definitions) are defined for a WSDL defined protected object space and, as such, are loosely coupled with the concrete WSDL binding derived from those definitions, preferably on a per binding level. This WSDL-defined POS is in turn loosely bound to a resource-specific protected object space definition. This loose coupling is leveraged to allow changes (e.g., updates) to the abstract WSDL binding's protected object space to be transitively applied to the application-specific protected object space. If appropriate, changes to the resource-specific protected object space may be applied to the WSDL's protected object space. Thus, according to the invention, the coupling may be one-way (typically, from the WSDL POS to the resource level POS) or two-way (from the WSDL POS to the resource level POS and vice versa). As will be seen, this technique ensures that different security policies are not applied unintentionally to the same resource (for example, one at the Web services/operation level, and the other at the application/EJB level). By synchronizing the protected object spaces in the manner described, neither the entity that deploys the application nor the security administrator need to be aware of the differences between the Web service request and the application request.

Figure 10A:
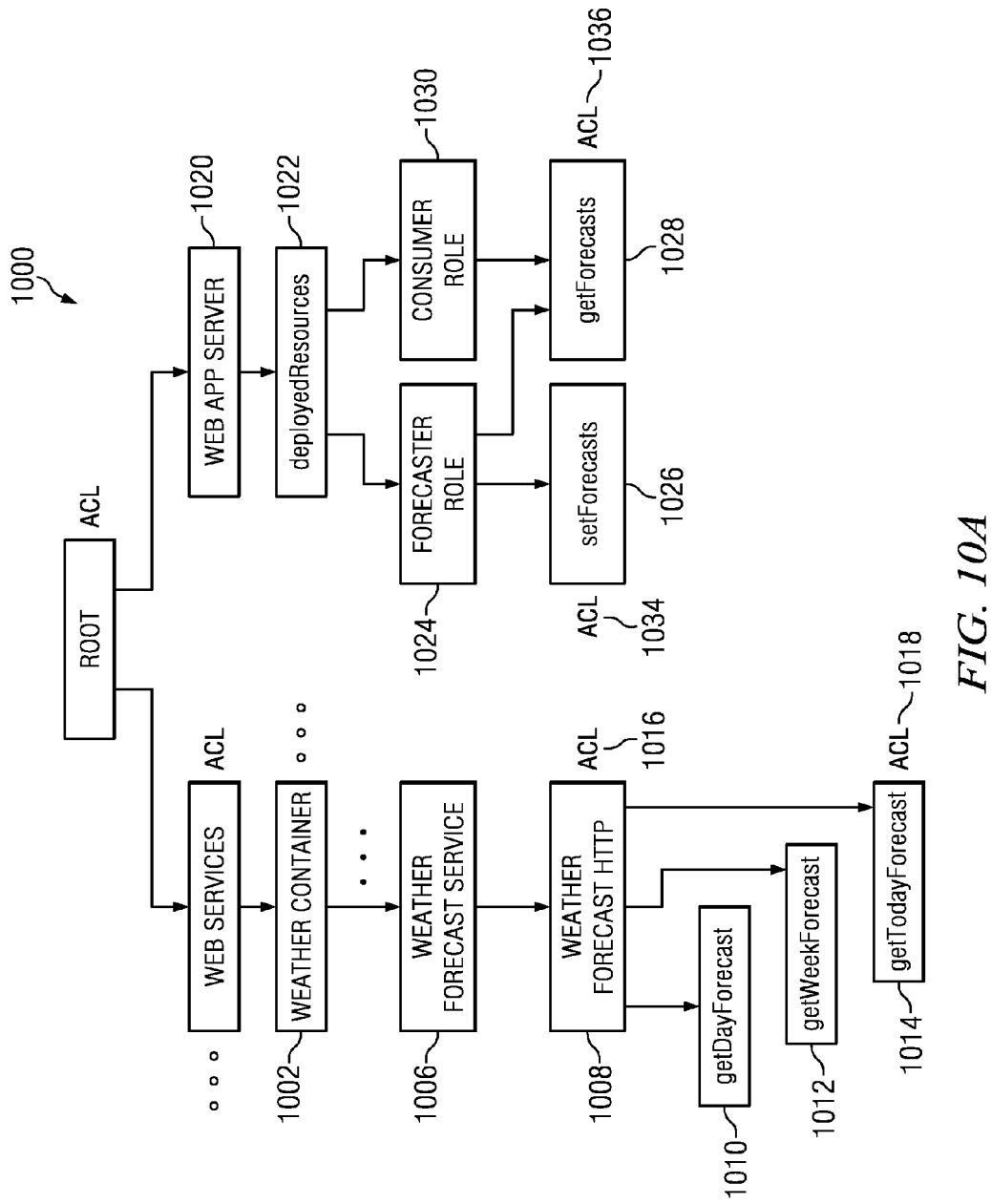
FIGS. 10A and 10B illustrate the present invention wherein a mapping is provided between a WSDL POS and a resource-specific POS.

FIG. 10A illustrates the invention by way of example. As can be seen, the Web services container 1002 contains the Weather Forecast Service WSDL POS 1006 that, in turn, contains an HTTP binding of a resource implementation 1008 that, in turn, contains Web services operations such as 1010, 1012 and 1014. This is similar to FIG. 5 described above. Also shown in FIG. 10A is a Web application server container 1020 with its protected object space, which includes two roles 1024 and 1030, namely, the Forecaster Role and the Consumer Role. These roles are able to access applications setForecast 1026 and getForecast 1028, as described above in FIG. 8. These applications are similar to the applications that are exposed as part of the WSDL protected object space, but there is no logical connection between them that will allow for the consolidated management of ACLs on these resources. For example, there is no way to ensure that ACLs 1016, 1018, 1034 and 1036 relate to the same resources and, if they do, no consistent way to manage them. Each ACL is its own entity that must be managed independently.

Figure 10B:
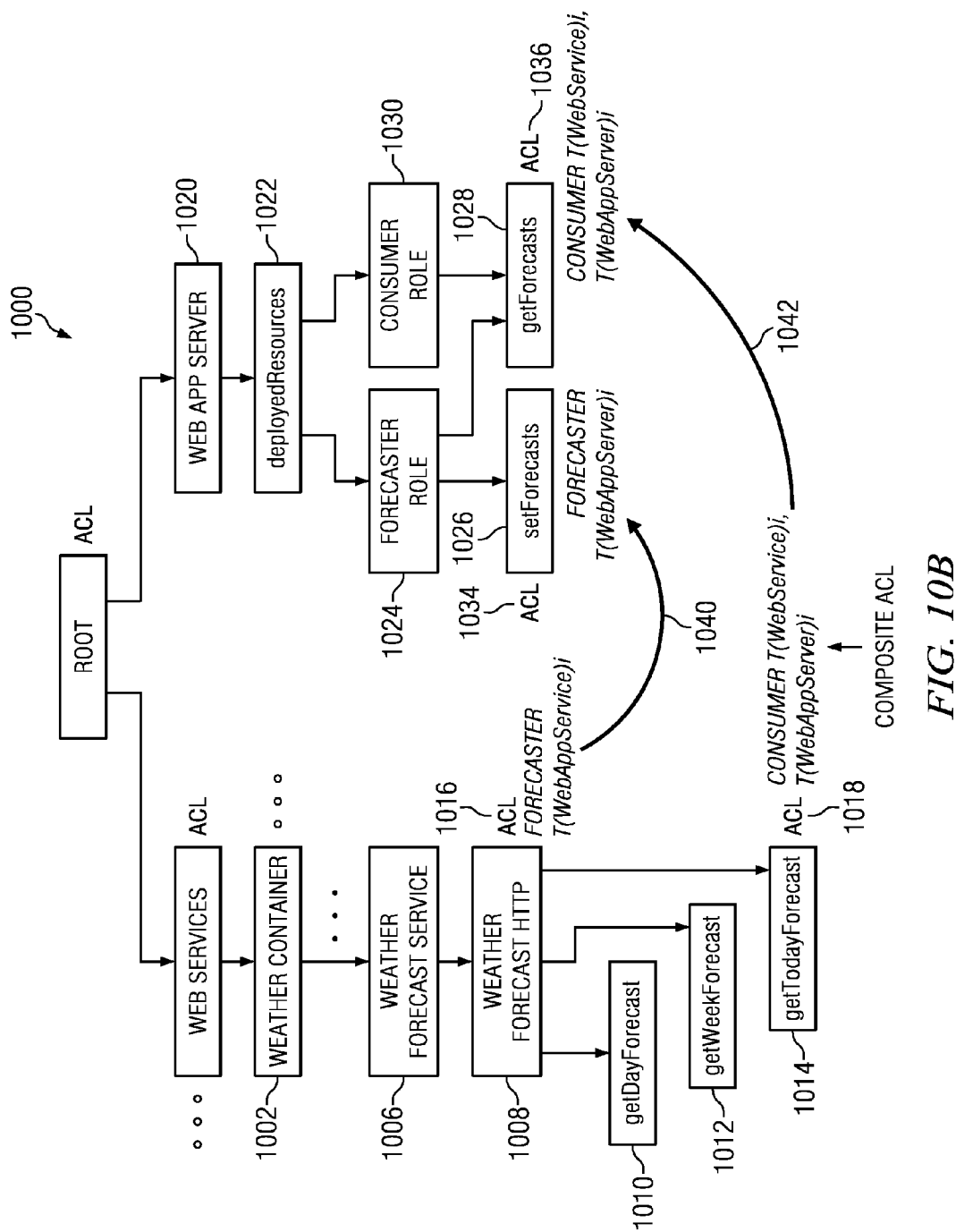

The present invention addresses this problem, as illustrated in FIG. 10B. In particular, FIG. 10B illustrates how a set of one or more loose couplings, when achieved, provide for a consistent management of ACLs and policy across these supposedly disparate protected object spaces. In particular, the WSDL POS for the Weather Service 1006 has been mapped to the application server POS 1020 through the set of connectors 1040 and 1042. Of course, the number of connectors is merely illustrative. In this example, the connector 1040 indicates that the WeatherForecast HTTP operation 1008 in the WSDL 1000 has an associated Forecaster group permission, which correlates with the setForecast application 1026 in the POS 1002. Likewise, the connector 1042 indicates that the getTodayForecast operation 1014 in the WSDL 1000 has an associated Consumer user permission, which correlates with the getForecasts application 1028 in the POS 1002. Based on these loose couplings, any permitted change to the ACL applied to the Weather Forecast HTTP operation 1008 in the WSDL 1000 is monitored and appropriately mapped to the setForecast application 1026 in the POS 1002; likewise, any permitted change to the ACL applied to the getTodayForecast operation 1014 in the WSDL 1000 is monitored and appropriately mapped to the getForecast application 1028 in the POS 1002. In this way, the protected object spaces are updated in a consistent and synchronized manner. Access control policies are maintained, irrespective of the type of request made (whether a Web service request, or an application-specific request).

Figure 11:
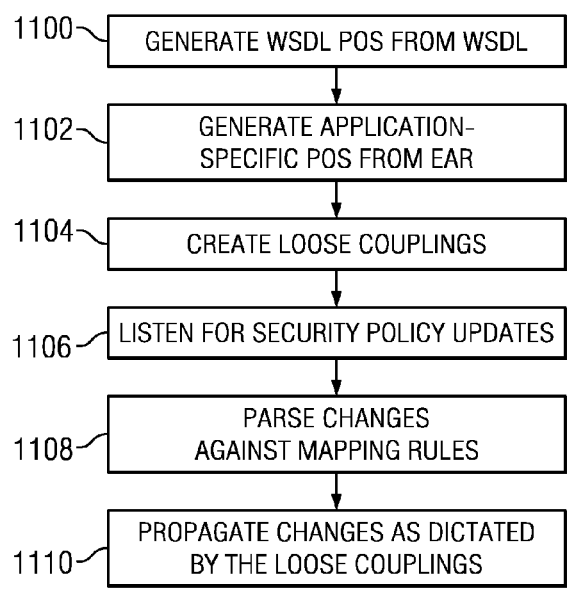
FIG. 11 illustrates how the mapping is generated according to an embodiment of the present invention.

Thus, the present invention provides a method for providing synchronized access control in a Web services environment where a given authorization decision typically is implemented in several places, e.g., at the Web service entry and within a given back-end application. Generalizing, the method of synchronized access control includes the process steps shown in FIG. 11. The method begins at step 1100 by generating a Web service protected object space from a WSDL. At step 1102, an application-specific protected object space is generated from an application code base (such as an enterprise archive file (EAR), or the like). Steps 1100 and 1102 may take place in an off-line manner. These steps have been described and illustrated above at a high level, e.g., see FIG. 6 and FIG. 9. At step 1104, a set of one or more couplings are then defined between corresponding objects in the protected object spaces. Of course, the identity of which objects are coupled across the protected object spaces necessarily will depend on the various operations and methods defined in the object spaces, as well as the security policies associated therewith. These couplings may be defined programmatically or by a user directly, e.g., using a visual mapping tool such as available from various commercial sources or via open source projects such as the Eclipse software development environment. A set of mapping rules is associated with the defined couplings. A convenient way to represent the mapping rules is to use an XML-based policy language such as XACML or WS-Policy. Thus, in the example of FIG. 10B, a mapping rule indicates that changes to the getTodayForecast operation in the WSDL POS implicates the getForecast application in the application-specific POS; similar mapping rules are defined for the other identified couplings. The mapping rules define whether and how changes to the elements in one protected object space affect elements in the other protected object space. Once the one or more object coupling(s) are made, security policy synchronization is effected in an automated manner by monitoring the protected object spaces for changes and selectively propagating those updates through the loose couplings. To this end, each POS has associated therewith a listener or filter. The synchronization method waits at step 1106 for an update to an access control. Any update to the ACLs placed on the WSDL POS will trigger the method at step 1108 to parse the change against the set of mapping rules. If a given mapping rule is implicated, the security policy change is applied to a corresponding object in the other protected object space. This is step 1110. If no mapping rule is implicated, the change is not propagated. The mapping rules define which changes are one-way (unilateral), and which changes are two-way (bilateral). As noted above, changes may be one-way (e.g., changes to the concrete WSDL protected object space are propagated to the application-specific protected object space, but not vice-versa), or two-way (meaning that access control changes are propagated in both directions). This completes the basic processing of the inventive method.

One of ordinary skill in the art will appreciate that the present invention is not limited for use merely with propagating ACL changes across protected object spaces. More generally, the present invention may be used to synchronize any security policy (whether implemented as an ACL, a POP, an authorization rule, or an extended attribute) across a first protected object space and a second protected object space, or vice versa. Moreover, the inventive technique may also be used in a Web services environment to provide synchronized access policy (based on a user's subscription parameters). In general, the present invention may be used to synchronize in an automated manner across any two or more hierarchical object spaces, irrespective of what those object spaces represent. All that is required is a tool for defining the object couplings, monitoring for changes to a given object attribute, parsing the change against a set of mapping rules, and then propagating the change.

Figure 12:
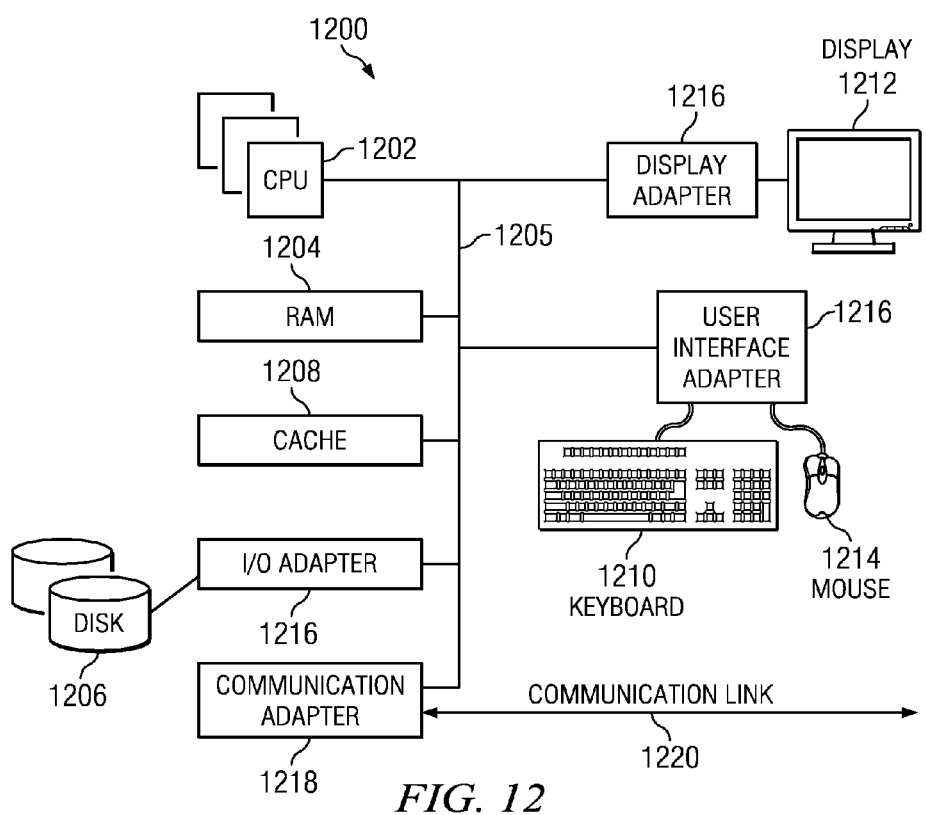
FIG. 12 is a block diagram of a representative data processing system in which the invention may be implemented.

FIG. 12 illustrates a representative data processing system 1200 for use in defining the protected object space couplings, for monitoring changes in the security policies, and for updating the protected object spaces as necessary. A data processing system 1200 suitable for storing and/or executing program code will include at least one processor 1202 coupled directly or indirectly to memory elements through a system bus 1205. The memory elements can include local memory 1204 employed during actual execution of the program code, bulk storage 1206, and cache memories 1208 that provide temporary storage of at least some program code to reduce the number of times code must be retrieved from bulk storage during execution. Input/output or I/O devices (including but not limited to keyboards 1210, displays 1212, pointing devices 1214, etc.) can be coupled to the system either directly or through intervening I/O controllers 1216. Network adapters 1218 may also be coupled to the system to enable the data processing system to become coupled to other data processing systems or devices through intervening private or public networks 1220.

The invention can take the form of an entirely hardware embodiment, an entirely software embodiment or an embodiment containing both hardware and software elements. In a preferred embodiment, the inventive transform is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

One or more of the above-described functions, namely: defining the POS couplings, monitoring for security policy updates, and propagating security changes across the protected object spaces, may also be implemented as a service.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method for providing synchronized access control in a Web services environment, comprising:
    defining at least one mapping that associates a given object in a protected object space for a Web service representation with a given object in a protected object space of a corresponding resource-specific protected object space, wherein a protected object space provides a logical and hierarchical portrayal of resources belonging to a domain;
    monitoring the Web service representation of the protected object space; and
    responsive to a change in an access control rule for the Web service representation of the protected object space, automatically applying the change to an access control rule for the corresponding resource-specific protected object space.

2. The method as described in claim 1 wherein the Web service representation of the protected object space is defined by a WSDL document.

3. The method as described in claim 1 wherein the access control rule is one of: an access control list, a protected object policy, an authorization rule, and an extended attribute.

4. The method as described in claim 1 further including the steps of:
    responsive to a change in an access control in the resource-specific protected object space, selectively propagating the change back to the protected object space for the Web service representation.

5. The method as described in claim 1 wherein the resource-specific protected object space is associated with given application code.

6. The method as described in claim 5 wherein the given application code is an enterprise archive file (EAR).

7. The method as described in claim 1 wherein the resource-specific protected object space is associated with a given application method access.

8. The method as described in claim 1 wherein the given object in the protected object space for the Web service representation is an operation object, and the given object in the protected object space for the corresponding resource-specific protected object space is a method object.

9. A computer-implemented method for providing access control in a web services environment having associated therewith a first protected object space and a second protected object space, wherein a protected object space provides a logical and hierarchical portrayal of resources belonging to a domain, comprising:
    mapping the first protected object space to the second protected object space, wherein the mapping associates an object in the first protected object space with a corresponding object in the second protected object space; and
    in response to a change to a given security policy associated with the first protected object space, automatically applying the change to a given security policy associated with the second protected object space.

10. The computer-implemented method as described in claim 9 wherein the security policy is one of: an access control list, a protected object policy, an authorization rule, and an extended attribute.

11. The computer-implemented method as described in claim 9 wherein the first protected object space is generated from a WSDL definition.

12. The computer-implemented method as described in claim 9 wherein the second protected object space is generated from an enterprise archive file.

13. The computer-implemented method as described in claim 9 further including the steps of:
    in response to a change to a given security policy associated with the second protected object space, selectively applying the change to a given security policy associated with the first protected object space.

14. A computer-implemented method for providing synchronized control in a Web services environment, comprising:
    associating an object in a first object space with an object in a second object space, wherein the first object space is associated with a Web service representation and the second object space is associated with a resource required to implement the Web service, an object space providing a logical and hierarchical portrayal of resources belonging to a domain;
    monitoring the first object space for changes to object attributes;
    upon detecting a change to an object attribute, wherein the object attribute is associated with a security policy, determining whether the change is associated with the object in the first object space;
    if the change is associated with the object in the first object space, propagating the change to the object in the second object space so that the first and second object spaces remain synchronized.

15. The computer-implemented method as described in claim 14 wherein the security policy is one of: an access control list, a protected object policy, an authorization rule, and an extended attribute.

16. A non-transitory computer-readable medium having computer-executable instructions that, when executed by a processor of a data processing system, perform a method for providing synchronized control in a Web services environment, the method comprising:
    associating an object in a first object space with an object in a second object space, wherein the first object space is associated with a Web service representation and the second object space is associated with a resource required to implement the Web service, an object space providing a logical and hierarchical portrayal of resources belonging to a domain;
    monitoring the first object space for changes to object attributes;
    upon detecting a change to an object attribute, determining whether the change is associated with the object in the first object space;
    if the change is associated with the object in the first object space, propagating the change to the object in the second object space so that the first and second object spaces remain synchronized.

17. Apparatus comprising a processor, and a computer-readable medium, the computer-readable medium having instructions that when executed by the processor perform a method for providing synchronized control in a Web services environment, the method comprising:
    associating an object in a first object space with an object in a second object space, wherein the first object space is associated with a Web service representation and the second object space is associated with a resource required to implement the Web service, an object space providing a logical and hierarchical portrayal of resources belonging to a domain;

monitoring the first object space for changes to object attributes;

upon detecting a change to an object attribute, determining whether the change is associated with the object in the first object space;

if the change is associated with the object in the first object space, propagating the change to the object in the second object space so that the first and second object spaces remain synchronized.

18. A computer-implemented method for providing synchronized control in a Web services environment having a first object space and a second object space, comprising:

associating given objects in the first object space with given objects in the second object space, an object space providing a logical and hierarchical portrayal of resources belonging to a domain, wherein the associating step defines a least one mapping that associates a given object in the first object space with a given object in the second object space; and automatically maintaining the given objects in the first object space synchronized with the given objects in the second object space by monitoring the first object space and, responsive to a change in an access control rule for the first object space, automatically applying the change to an access control rule for the second object space.

19. The computer-implemented method as described in claim 18 wherein the given objects in the first object space are synchronized with the given objects in the second object space to enforce a security policy.

20. The computer-implemented method as described in claim 19 wherein the security policy is one of: an access control list, a protected object policy, an authorization rule, and an extended attribute.

21. The computer-implemented method as described in claim 18 wherein the first object space is generated from a WSDL definition.

22. The computer-implemented method as described in claim 18 wherein the second object space is generated from an enterprise archive file.

23. A computer program product comprising a non-transitory computer useable medium having a computer readable program, wherein the computer readable program when executed on a computer causes the computer to perform the following method steps:

defining at least one mapping that associates a given object in a protected object space for a Web service representation with a given object in a protected object space of a corresponding resource-specific protected object space, wherein a protected object space provides a logical and hierarchical portrayal of resources belonging to a domain;

monitoring the Web service representation of the protected object space; and responsive to a change in an access control rule for the Web service representation of the protected object space, automatically applying the change to an access control rule for the corresponding resource-specific protected object space.

* * * * *